June 20, 1933.   H. C. HAGMAN   1,914,718
WAX ELIMINATOR
Filed May 26, 1930   2 Sheets-Sheet 1

Inventor
Harry C. Hagman
By Caswell & Sagaard
Attorneys

June 20, 1933.   H. C. HAGMAN   1,914,718
WAX ELIMINATOR
Filed May 26, 1930   2 Sheets-Sheet 2
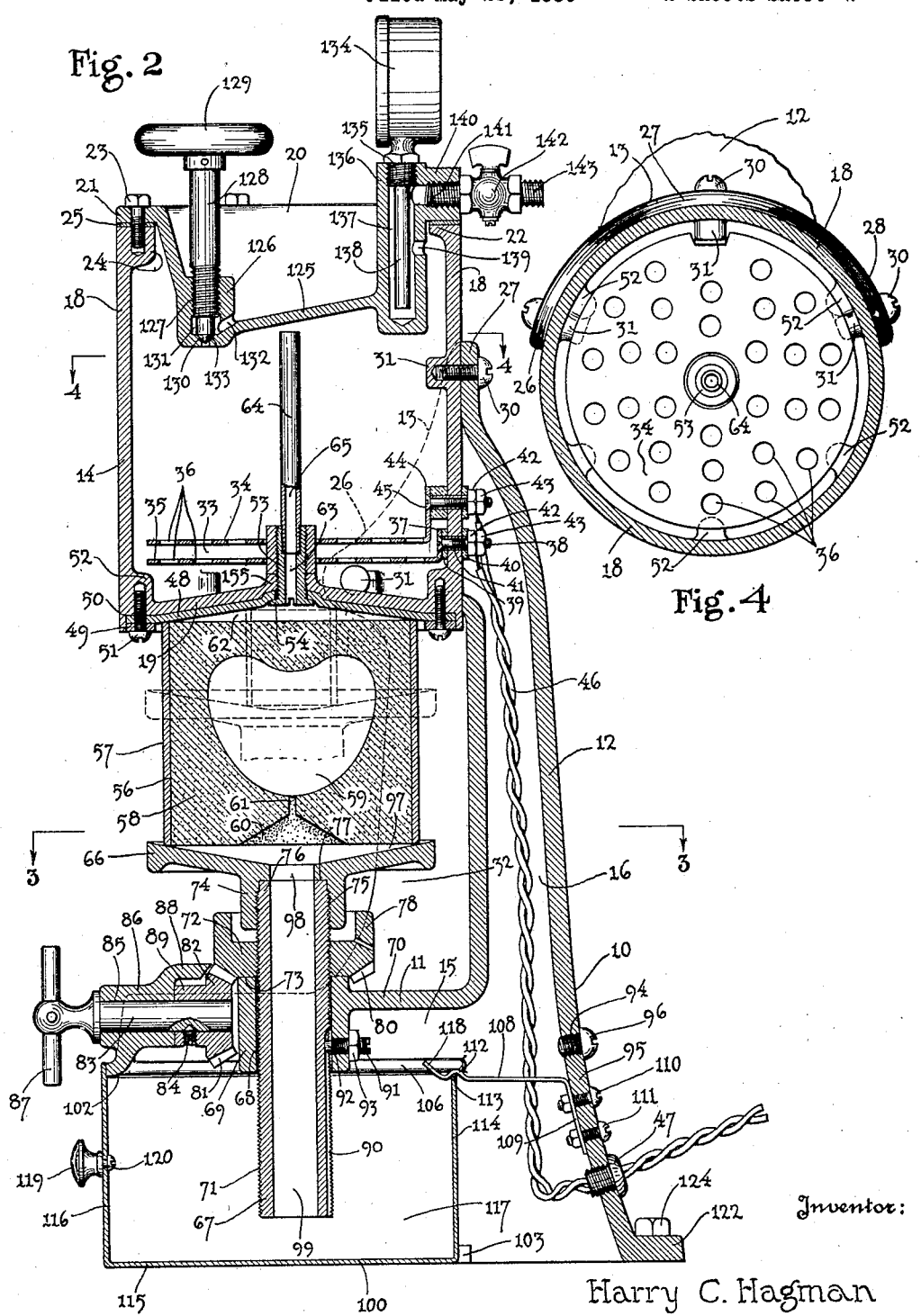
Inventor:
Harry C. Hagman
By Caswell & Sagaard
Attorneys Patented June 20, 1933

1,914,718

UNITED STATES PATENT OFFICE

HARRY C. HAGMAN, OF MINNEAPOLIS, MINNESOTA

WAX ELIMINATOR

Application filed May 26, 1930. Serial No. 455,718.

My invention relates to devices for eliminating fusible patterns from molds and particularly to devices for eliminating wax patterns from dental molds.

An object of the invention resides in providing a device whereby the fusible pattern may be eliminated through the agency of a fluid under pressure confined within a suitable container.

Another object of the invention resides in constructing the device with a base and a standard issuing upwardly therefrom, and in supporting the container for the fluid under pressure upon said standard.

An object of the invention resides in disposing the mold between said base and container.

A still further object of the invention resides in providing a seat against which one end of the mold is seated, together with means for urging the mold against said seat, and in providing means for bringing the portion of the mold seated against said seat into communication with said container.

An object of the invention resides in disposing said seat in the bottom of said container and in further providing an outlet in said bottom communicating with said container for conducting the fluid under pressure to the portion of the mold seated against said seat.

A feature of the invention resides in constructing said seat dished to form a space above said mold into which the fluid under pressure is conducted.

An object of the invention resides in forming a guideway in said base and in disposing within said guideway a post carrying a bed upon which the mold is supported.

Another object of the invention resides in threading said post and in screwing thereon a nut for moving said post along said guideway to urge said mold against said seat.

A still further object resides in providing said nut with a bevel gear and in journaling another bevel gear in said base for operating said first named gear.

A feature of the invention resides in disposing said gears so that the same may be readily disengaged for rapid manipulation of said nut in readjusting the device.

An object of the invention resides in constructing said post with a passageway extending therethrough to conduct the pattern eliminated from the mold away from the device.

Another object of the invention resides in disposing beneath said hollow post a receptacle for the reception of the pattern discharged from the passageway in said post.

Another object resides in using said container as a boiler and in disposing within said boiler at the bottom thereof a pair of plate-like electrodes serving as a heater for generating steam within said boiler.

A still further object resides in forming said standard with a channel extending along the same and in constructing said heater with connections extending through the wall of said boiler, and to further provide conductors for energizing said heater, said conductors extending through the channel in said standard.

A feature of the invention resides in providing an outlet in the bottom of the boiler, and in connecting therewith a tube extending upwardly into said boiler above the water level therein, said tube passing through said plate-like electrodes.

An object of the invention resides in constructing said boiler open at the top and in providing a head for closing the upper end of said boiler, said head being constructed in the shape of a funnel for directing the water into the boiler, and in further providing a valve for controlling the flow of water through said funnel and into said boiler.

Another object resides in providing a vent for permitting the escape of the air from the boiler during the flow of water through said funnel.

A still further object resides in providing a gauge and in mounting said gauge in said cap.

An object of the invention resides in providing means for connecting the container to a separate source of fluid under pressure.

Other objects of the invention reside in the novel combination and arrangement of parts and in the details of construction hereinafter illustrated and/or described.

In the drawings:

Fig. 2 is a sectional view taken on line 2—2 of Fig. 1.

Fig. 4 is a plan sectional view of the boiler taken on line 4—4 of Fig. 2.

Figures 1, 3, 5:
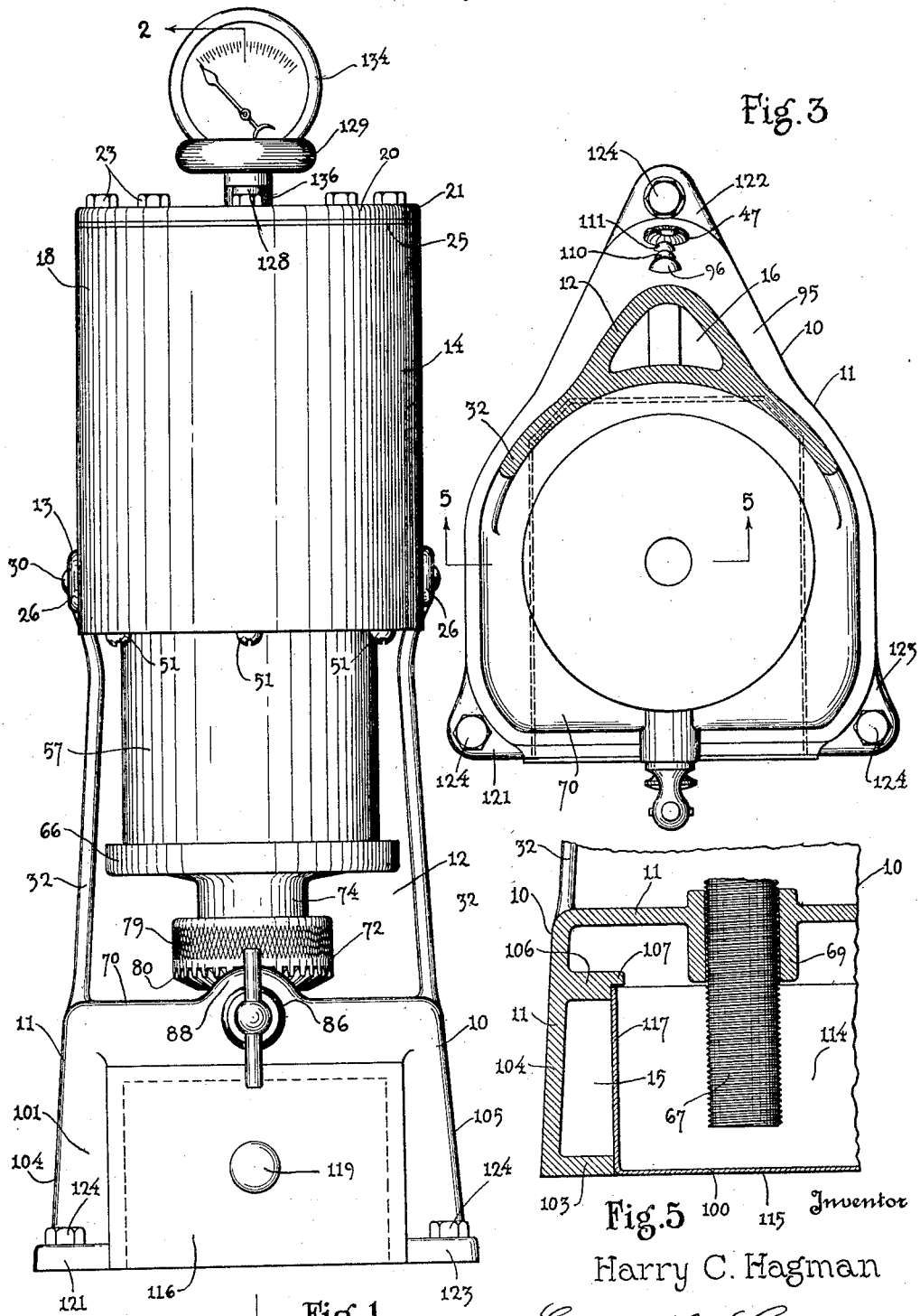
Fig. 1 is a front elevational view of a device for eliminating fusible patterns from molds illustrating an embodiment of my invention.
Fig. 3 is a plan sectional view taken on line 3—3 of Fig. 2.
Fig. 5 is a fragmentary elevational sectional view taken substantially on line 5—5 of Fig. 3.

My invention is used for the purpose of eliminating fusible patterns from molds and is particularly adapted for use in the construction of dental inlays, bridges, and similar castings. In the construction of such castings, a mold such as shown at 56 in Fig. 2 is employed which comprises a ring-like mold member 57 open at the ends. In the forming of the mold, a wax model or replica of the structure to be cast is first formed and the same mounted upon a sprue pin attached to a suitable conical base as disclosed in the patent to Taggart No. 865,823. The ring is then placed about the pattern and a suitable mold material, such as is known in the art as investment which includes plaster of Paris and other ingredients, is poured about the wax pattern and allowed to set. When properly set, the investment forms the body of the mold which I have indicated at 58 in Fig. 2 in which the wax pattern 59 is completely imbedded except for the sprue pin. After the mold body has become sufficiently rigid the sprue pin and base are removed leaving a conical cavity 60 at one end of the mold which communicates through the sprue passageway 61 with the wax pattern proper.

My invention comprises primarily a frame or supporting structure which I have indicated in its entirety at 10. This frame includes a base 11 from which issues upwardly a standard 12 terminating in an annular flange 13 by means of which a boiler or container 14 may be secured to the frame 10. The frame 10 is preferably constructed in the nature of a casting and the standard 12 is preferably cast integral with the base 11 though this standard may be detachably mounted upon the base if desired. Where the frame 10 is formed as a casting, the base 11 and the standard 12 thereof are constructed hollow to provide a compartment 15 within said base and a channel 16 within said standard extending throughout the length thereof and communicating with the compartment 15. When so constructed, the base 11 is formed with a top 70, a rear wall 95 which lies in continuation of the rear wall of the standard 12, side walls 104 and 105, and a front wall 101, which front wall is formed with an opening 102 therein.

The entire device may be rigidly secured to a table or to any other surface on which the same is to be mounted. For this purpose, the frame 10 is formed with three lugs 121, 122, and 123, which issue outwardly from the walls 101, 104, 95 and 105 of said frame at the lowermost portions thereof. These lugs are drilled to receive lag screws or bolts 124 by means of which the frame 10 may be rigidly held in place.

The boiler 14 is preferably cylindrical in form as shown in Figs. 2 and 4 and is constructed with a cylindrical wall 18 and a bottom 19 connected therewith. This receptacle is open at the top and is closed by means of a head 20 which is formed with an outwardly extending flange 21 adapted to overlie an inwardly extending flange 22 at the upper end of the wall 18 of said boiler. The head 20 is secured to the boiler 14 by a number of cap screws 23 which pass through the flanges 21 and 22 and which are threaded into bosses 24 formed upon the interior of the boiler in proximity to the flange 22. A gasket 25 disposed between the flanges 21 and 22 serves to make a tight connection between the head 20 and the boiler proper.

The head 20 is constructed funnel shaped as indicated at 125 in Fig. 2 and is provided at the lowermost portion thereof with a boss 126. This boss is drilled to form a valve chamber 131 and is tapped as indicated at 127 to receive a threaded valve stem 128 which is provided at the upper portion thereof with a handle 129 by means of which said valve stem may be rotated. At the end of boss 126 is formed a conical opening 130 which serves as a valve seat and which communicates with the interior of the boiler proper, and with the chamber 131. A passageway 132 extends through the boss 126 and leads from the interior of the funnel structure 125 to the valve chamber 131. On the end of the valve stem 128 is formed a valve head 133 which is adapted to seat against the conical seat 130 and to close communication between the interior of the boiler and the exterior. When the handle 129 is rotated so as to unseat the head 133 from the seat 130, water which is poured into the funnel 125 may drain through the passageway 132 and the opening 130 and into the boiler proper.

For determining the pressure within the boiler 14, a pressure gauge 134 is employed which may be of the Bourdon type or of any other type desired. This gauge is formed with a threaded neck 135 which is screwed into the upper end of an elongated boss 136 situated toward the rear of head 21 cast integral therewith. The boss 136 is constructed with a bore 137 extending throughout the length thereof which is closed at its lower end. Attached to the neck 135 of the gauge 134 is a tube 138 which extends down into the bore 137 to within a short distance of the bottom thereof. A vent hole 139 in the boss 136 situated appreciably above the lower end of the tube 138 brings the interior of the gauge 134 into communication with the boiler proper so that the pressure within the boiler may be registered upon the gauge. The construction formed by boss 136 and the tube 138 takes the place of the usual goose neck employed with pressure gauges so that an extremely neat mounting for the gauge is provided without necessitating the extension of the gauge for a considerable distance above the boiler proper.

At the rearward portion of the boss 136 is formed another boss 140 which is drilled and internally threaded at 141 to form a passageway communicating with the bore 137. A valve or cock 142 may be screwed into the threaded portion 141 of said boss. This valve serves a two-fold purpose. When water is being filled into the boiler through the passageway 132 and the opening 130, the valve 142 may be opened to provide a vent through the port 139 for permitting the air to escape from the boiler during its replacement by the water. In this manner, the boiler is quickly and effectively filled with water. The valve 142 is formed with a threaded nipple 143 by means of which said valve may be connected to a pipe line communicating with a source of steam under pressure. Whenever it is desired to supply the device with fluid under pressure from another source, the valve 142 is utilized. In such case, the boiler 14 serves as a container for storing the fluid under pressure to be used in eliminating the wax from the mold.

As previously stated, the upper end of the standard 12 is formed with an annular flange 13 which is constructed of the same curvature as the boiler 14, and is adapted to fit about the same. This flange is constructed with three ears 26, 27 and 28 of which the ears 26 and 28 are disposed near the bottom 19 of the boiler and the ear 27 near the upper portion of said boiler. The boiler is attached to the standard 12 by means of screws 30 which pass through the ears 26, 27 and 28 which screws are threaded into bosses 31 formed upon the interior of the boiler proper. Due to the disposition of the ears 26, 27 and 29 the boiler is rigidly attached to the standard 12 and in a manner to effectively resist the strain imparted to the structure when the same is put in use as will be presently described in detail. For the purpose of reinforcing the standard 12 the flange 13 is extended below the boiler 14 to form a web 32 (Fig. 3) which extends throughout the extent of the device and is integrally connected to the top 70 of the base 11.

Within the interior of the boiler 14 is disposed a heater indicated in its entirety at 33 which consists of two plates 34 and 35 constructed of sheet material and provided with a number of perforations 36 extending completely through the same. The plate 35 is formed with an ear 37. A bolt 38 passes through this ear and through the wall 18 of the boiler 14. This bolt is insulated from the said boiler through two insulating washers 39 and 40 and an insulating sleeve 41, and is rigidly held in place with respect to said boiler through a nut 42 and a lock nut 43. In a similar manner the plate 34 is formed with an ear 44 which is attached to the wall 18 of the boiler through a bolt 45 also insulated from said boiler in identically the same manner as the bolt 48. The ears 44 and 37 are constructed offset so that the same become spaced from one another in order that plates 34 and 35 may be insulated from one another and in order that the bolts 45 and 38 may serve as terminals for connecting the electrical conductors for energizing the heater 33 to said plates. Both the bolts 45 and 38 extend into the channel 16 within the standard 12. A pair of conductors or a suitable electric cord 46 is connected to these terminals by means of lock nuts 43 screwed upon said bolts, and said cord follows along the channel 16 passing outwardly from the interior of the frame 10 through a bushing 47 (Fig. 2). By means of this construction the connections to the heater 33 are entirely concealed and the cord for supplying the electric current thereto leaves the device from the rear thereof so as to prevent injury to the cord or short circuiting of the wiring by accident.

The bottom 19 of the boiler 14 is constructed dished as shown in Fig. 2 and has placed upon the underside thereof a rubber or similar sheet of gasket material 48 which covers the entire surface of said bottom. This gasket is held in place upon said bottom through an annular clamp ring 49 which is received within a recess 50 in the lower end of the wall structure 18 of said boiler and which is held in clamping position through a number of machine screws 51 threaded into bosses 52 similar to the bosses 24 and which are formed upon the interior of the boiler. The central part of the gasket 48 is held in place through a nipple 53 which passes through said gasket and is threaded into a boss 155 formed on the bottom 19 within the interior of the boiler. The nipple 53 is constructed with a head 54 which engages the gasket 48 and forces the same in contact with the dished under surface of bottom 19 of said boiler. The gasket 48 serves as a seat against which the ring-like member 57 of the mold 56 is seated when the device is in use. When so disposed the dish of said bottom 19 causes a chamber 62 to be formed above the mold proper. This chamber communicates with the interior of the boiler 14 through a passageway 63 in nipple 53. To bring the inlet to the passageway 63 above the water level, a tube 64 is employed which is threaded into nipple 53 so as to bring the bore 65 thereof into communication with said passageway. This tube extends to within a short distance of the underside of the head 20 of the boiler and is open at the top so that the steam is removed from the boiler above the water line and conducted into the space 62 where the same passes through the body 58 of the mold structure and eliminates the wax therefrom as will be later more fully described.

For the purpose of urging the mold 56 against the seat 48 and to form a steam tight connection between said mold and seat, a bed 66 is employed which is attached to the upper end of a post 67. The post 67 as slidably mounted in a vertical guideway 68 formed within a boss 69 issuing upwardly from the base 11 and integrally connected to the top 70 thereof. The post 67 is externally threaded as indicated at 71 to receive a nut 72 which is screwed upon said threads and engages the upper end 73 of the boss 69. By rotating said nut the bed 66 may be raised and lowered as required. In the use of the device the mold 56 is placed upon the bed 66 and the nut 72 rotated until the upper edge of the ring-like member 57 is brought to bear against the seat 48 and a steam tight joint effected therebetween.

The post 67 is attached to the bed 66 as follows. On the underside of the bed 66 is formed a downwardly extending boss 74 which is internally threaded at 75 to receive the threaded end 76 of the post 67. This end of the post abuts against a shoulder 77 formed on the bed 66 whereby pressure imparted to said post is transmitted to the bed 66 and mold 56 so that said mold is forced against seat 48.

In order to prevent the post 67 from rotating when the nut 72 is turned, said post is formed with a key way 90 extending longitudinally along the lower portion thereof. A screw 91 is screwed into the boss 69 in which the guideway 68 is formed, said screw being formed with a pin 92 adapted to enter into the keyway 90. This screw may be held in adjusted position through a nut 93 screwed upon said screw and engaging the boss 69. The drilling and tapping of the hole in the boss 69 for the reception of the screw 91 may be accomplished through an opening 94 in the rearward wall 95 of the frame 10 which may be later closed by a screw 96 screwed into said opening.

For the purpose of operating the nut 72 by hand, the same is constructed with a sleeve-like portion 78 which extends upwardly from said nut and is adapted to encircle the boss 74 when the bed 66 is in its lowermost position. The external surface of this portion of the nut is knurled as indicated at 79 in Fig. 1 to permit of readily turning the same by hand.

In order to apply sufficient pressure upon the bed 66 to effect the desired seal between the mold 56 and the seat 48 the following construction is employed. Upon the under surface of the nut 72 is formed beveled gear teeth 80 which mesh with the teeth 81 of a bevel gear 82. This gear is provided with a hub 89 and is secured to a short shaft 83 through a set screw 84 threaded in said hub. The shaft 83 is journaled in a bearing 85 formed by boring a boss 86 issuing outwardly from the base 11 at the front thereof. Upon the end of the shaft 83 is attached a handle 87 by means of which said shaft may be rotated to simultaneously rotate the nut 72 and move the bed 66 in either direction. As will be noted from Fig. 2, the gear 82 is of smaller diameter than the gear on the nut 72 so that a suitable leverage is provided whereby the nut may be more readily rotated and the desired degree of pressure obtained. To protect the gear 82 from substances which may be deposited upon the top 70 of the base 11, a gear guard 88 is employed which is cast integral with the boss 86 and which overlies the hub 89 of said gear and partially overlies the gear teeth 81 thereof.

As the device operates, the excess steam, water, and wax which is eliminated from the mold 56 passes through the sprue hole 61 and into the conical space 60 in said mold where the same is deposited upon the upper surface 97 of the bed 66. This surface is preferably constructed funnel shaped as shown so as to direct the matter so collected into a central opening 98 in said bed which communicates with a longitudinal bore 99 extending completely through the post 67. The substances received within this bore pass completely through the post and are collected in a receptacle 100 disposed within the compartment 15 in base 11 and from which said matter may be removed from the device whenever desired. The receptacle 100 may be constructed of sheet metal and is formed with a bottom 115, a front wall 116, a rear wall 114, and side walls 117, said receptacle being open at the top as best shown in Fig. 2. To permit of inserting this receptacle into the compartment 15, the front wall 101 of the base 11 is provided with a rectangular opening 102 of proper size. The receptacle is guided in place into the compartment 15 by means of a pair of lower guides 103 which issue inwardly from the lower portion of the walls 104 and 105 of said base and through similar guides 106 disposed near the upper portions of said walls. These latter guides are formed with flanges 107 which hold the receptacle 100 at the proper elevation.

For the purpose of holding the receptacle 100 in place within the compartment 15 a leaf spring 108 is employed which is formed with a bent portion 109 adapted to be secured to the wall 95 of the frame 10 through two machine screws 110 and 111. This leaf spring is constructed at the free end thereof with a notched portion 112 adapted to engage the upper edge 113 of the rear wall 114 of receptacle 100. The extreme end 118 of this spring is bent upwardly so that upon inserting the receptacle 100 into the base 11, the upper edge 113 of the rear wall 114 of said receptacle raises spring 108 to cause the edge of said receptacle to become lodged within notch 112. This holds the receptacle firmly in place within the device. For the purpose of manipulating receptacle 100, the same is provided with a knob 119 which is attached to the front wall 116 of said receptacle through a screw 120.

The operation of my invention is as follows. The molds are constructed as previously brought out in accordance with the teaching of the Taggart patent previously referred to and allowed to become set. The bed 66 is first lowered by turning the nut 72 to give sufficient space between the seat 48 and said bed to receive the mold proper. Where a mold such as illustrated at 56 in Fig. 2 is employed, the same is next placed upon the bed 66 in an inverted position with the conical cavity 60 and the sprue hole 61 thereof extending downwardly. The bed 66 with the mold thereon is then raised manually until the upper edge of the mold ring 57 engages the seat 48. This is readily accomplished due to the fact that the post 61 is freely slidable in the guideway 68 and due to the fact that the teeth 80 on the nut 72 engage the beveled gear 82 from above the same. As the bed 66 is raised, the nut 72 is carried along with it and separated from the gear 82. The mold is then adjusted laterally to form a perfect seat and is then held in such position. While the parts are so held in place, the nut 72 is given a twist by engagement with the knurled portion 79 thereof which causes said nut to rotate rapidly until the teeth 80 thereof engage the teeth 81 of the gear 82. The handle 87 is then rotated which causes the nut 72 to be turned upon the threads 71 of post 67 which forces said post and the bed 66 upwardly until a positive seal is effected between the upper end of the mold ring 57 and the seat 48. In the use of the device, the mold is always centered upon the bed 66 as nearly as possible which brings the sprue hole 61 immediately above the passageway 99 in the post 67. This permits the substances eliminated from the mold to pass through the opening 98 in bed 66 and the bore 99 in post 67 to the receptacle 100 where said substances may be later removed as said receptacle becomes filled.

After the mold has been properly mounted, the valves 133 and 142 are opened and a measured amount of water poured into the funnel 125. This water immediately drains into the boiler proper and covers the two plates 34 and 35 of the heating device 33. As the water drains into the boiler the air escapes through the port 139, passageways 137 and 141 and valve 142 to the atmosphere thereby allowing the water to freely enter the boiler. Both of the valves 133 and 142 are next closed. The electric current for energizing the heater 33 is then turned on. Due to the conductivity of the water, the current passes through the water and heats the same causing steam to be generated within the boiler 14 and to accumulate in the upper portion thereof. It might be here stated that the boiler is constructed of a sufficient capacity so that the same need only be partly filled with water leaving sufficient space at the upper portion thereof for the accumulation of the necessary amount of steam required to operate the device. As the pressure builds up within the boiler 14, the steam escapes through the tube 64 and through the passageway 63 in nipple 53 and into the chamber 62 formed above the mold proper through the dishing of the bottom 19 of the boiler. From here the steam passes under pressure through the body structure 58 of the mold and to the wax pattern 59 within the same. As the generation of steam continues, the body 58 of the mold becomes heated which melts the wax pattern 59. Due to the pressure of the steam, the pattern is forced out through the sprue hole 61 and into the conical space 60 where the same passes through the passageway 99 in port 67 and into the receptacle 100. All condensed steam which falls upon the surface 97 of the bed 66 is likewise drained into the receptacle 100 where the same may be removed as required. Due to the pressure of the steam, the steam is eventually forced into the mold cavity proper and through the walls of the mold cavity which has the effect of washing the wax from the mold wall so as to leave an absolutely clean and wax free cavity within the mold. When the wax is thus removed from the pores of the mold, the fumes occurring when the molten metal is flowed into the mold may readily escape therefrom so that a smooth casting is formed without the usual blow holes or irregularities frequently found in similar castings. Due to the construction of the device, sufficient steam may be generated to thoroughly and completely perform the desired functions regardless of the size of the mold so that any size or type of mold may be equally as well operated to eliminate the wax pattern therefrom.

With my particular invention, the generation of steam continues until a sufficient amount of the water has been evaporated to break the connection between the two plates 34 and 35. When this occurs, the current ceases to flow and the device is automatically shut off. It hence becomes readily apparent that by selecting the proper amount of water, the device can be made to run as long as desired and sufficient steam generated to perform the functions intended. It will hence become evident that after the device has been set into operation, the attendant may go about his other business and return to the device at any subsequent time to remove the mold from the same without having the worry about shutting off the steam after the elimination process is complete.

When the operation is completed and all of the wax and foreign substances have been removed from the mold cavity, the handle 87 is turned in the opposite direction and the nut 72 loosened. This nut may then be rotated manually in the opposite direction freeing the same from the gear 82 and causing said nut to travel upwardly along the post 67. After the nut has traveled sufficiently, the bed 66 and said post may be lowered along the guideway 68 which frees the mold 56 from the seat 48 after which the same may be removed.

When it is desired to remove the receptacle 100 from the base 11 to empty the contents thereof, the post 67 is raised as far as it will go which causes the lower end of said post to clear the upper edge 113 of the rear wall 114 of said receptacle after which said receptacle can be withdrawn from the device by merely pulling on the knob 119. In replacing the receptacle, the reverse procedure is adopted.

By means of the nipple 143 on the valve 142 the device can be supplied with steam from an external source so that the invention is extremely practical for installation in laboratories where steam or fluid under pressure is available for the desired purpose.

My invention is highly advantageous in that an extremely sturdy and rigid construction is provided whereby the desired results may be effectively produced. The pressure exerted in clamping the mold in place is applied centrally with respect to the mold so that uniform pressure is applied to the mold throughout its extent giving a positvie seal between the mold and the seat against which the end of the same is seated. By means of the screw and the gears for operating the same, considerable pressure can be applied to the mold so as to rigidly clamp the same in place and effect the desired seal. By constructing the nut with the inverted gear teeth, the bed can be raised and lowered independently of the gears so as to permit of rapidly mounting the mold in the device. Due to the formation of the bed and the post supporting the same with the passageway therethrough, all the material discharged from the pattern is directed into the refuse receptacle from which the same may be removed as the occasion requires. By means of the particular heating device employed for generating the steam within the boiler 14, the attendant's attention is only required in the starting of the device. When the operation is completed, the current is automatically shut off and the mold may be allowed to cool until such time as the attendant is ready to remove the same from the device. The head of the boiler being constructed in the form of a funnel 19, the water may be easily and quickly inserted into the boiler. Due to the formation of the standard, all of the wiring connected to the heater within the boiler passes through the channel 16 therein so that no exposed wiring is present thereby rendering the device more safe and at the same time preventing injury to the wiring and shorts in the system. The device is practically fool-proof and may be operated indefinitely without attention.

It can readily be comprehended that various modifications and changes in the invention may be made such as the movement of the boiler 14 toward the bed 66 instead of movement of the bed toward the boiler. Also the guide for the movable part of the invention may be disposed to one side of the clamping structure instead of in alignment with the axis of the boiler and mold. Also the disposition of the receptacle 100 may be changed to correspond with other changes in the construction of the device and likewise different forms of devices employed for moving the parts relative to one another. As stated, all of these changes and others may be readily made within the scope of the invention without departing from the spirit of the invention as brought out in the claims.

Changes in the specific form of my invention as herein described may be made within the scope of what is claimed without departing from the spirit of the invention.

Having described my invention what I claim as new and desire to protect by Letters Patent is:

1. In a device for eliminating fusible patterns from molds, a base, means forming a seat against which one end of a mold may be seated, said seat superimposing said base, means for conducting a fluid under pressure to the portion of the mold seated against said seat, means for holding the mold in said seat, and a receptacle at said base for the reception of the pattern eliminated from said mold.

2. In a device for eliminating fusible patterns from molds, a base, means forming a seat against which one end of the mold may be seated, said seat superimposing said base, means for conducting a fluid under pressure to the portion of the mold seated against said seat, means for holding the mold against said seat, said base being formed hollow, and a receptacle within the hollow portion of said base for the reception of the pattern eliminated from said mold.

3. In a device for eliminating fusible patterns from molds, a base, means forming a seat against which one end of a mold may be seated, said means superimposing said base, means carried by said base for urging said mold against said seat, said means including an upwardly extending member, said member having an opening therethrough for conducting the pattern eliminated from said mold away from the device.

4. In a device for eliminating fusible patterns from molds, a base, means forming a seat against which one end of a mold may be seated, said means superimposing said base, means carried by said base for urging said mold against said seat, said means including an upwardly extending member, said member having an opening therethrough for conducting the pattern eliminated from said mold away from the device, and a receptacle disposed below said member, said base holding the lower end of said member above the bottom of said receptacle.

5. In a device for eliminating fusible patterns from molds, a base, means forming a seat against which one end of a mold may be seated, said means superimposing said base, a post slidable upwardly with respect to said base, means carried by said base for urging said mold toward said seat, said post having a passageway therethrough for conducting the pattern eliminated from said mold away from said device from below.

6. In a device for eliminating fusible patterns from molds, a base, means forming a seat against which one end of a mold may be seated, said means superimposing said base, a guideway formed in said base, a threaded post slidable along said guideway and toward and from said seat, and a nut screwed upon said threaded post and engaging one end of said guideway for moving said post along said guideway.

7. In a device for eliminating fusible patterns from molds, a base, means forming a seat against which one end of a mold may be seated, said means superimposing said base, a guideway formed in said base, a threaded post slidable along said guideway and toward and from said seat, a nut screwed upon said threaded post and engaging one end of said guideway for moving said post along said guideway, a gear connected to said nut, a gear journaled for rotation in said base and meshing with the gear on said nut, and a handle for rotating said second named gear to move said post along said guideway.

8. In a device for eliminating fusible patterns from molds, a base, means forming a seat against which one end of a mold may be seated, said means superimposing said base, a guideway formed in said base, a threaded post slidable along said guideway and toward and from said seat, a nut screwed upon said threaded post and engaging one end of said guideway, a bevel gear connected with said nut and having the teeth thereof facing downwardly, another bevel gear journaled in said base, the teeth thereof being adapted to mesh with the teeth of said first named bevel gear, said gears being disengageable from one another in order that the post may be rapidly raised to bring the mold into contact with said seat, said nut being freely rotatable upon said post in order that the same may be rapidly moved into a position toward and from said gear by manual engagement therewith.

9. In a device for eliminating fusible patterns from molds, a base, a hollow standard issuing upwardly therefrom, a boiler attached to said standard, means for supporting a mold in proximity thereto, means for conducting fluid under pressure from said boiler to said mold, a heating element within said boiler, connections connected to said heating element and extending through the wall of said boiler, and conductors disposed within said hollow standard and connected with said connections for energizing said heater.

10. In a device for eliminating fusible patterns from molds, a base, a guideway formed in said base, a post slidable along said guideway, a table on said post for supporting a mold, a seat superimposing said table means carried by said base for urging the table toward said seat and means for directing a fluid under pressure to said seat.

11. In a device for eliminating fusible patterns from molds, a base formed with a top, side and end walls and having an opening in one of said end walls, a drawer slidable into and out of said opening to a position beneath said top, a mold engaging member carried by said top and having an opening therethrough for conducting the discharge from the mold into said drawer and means for engagement with another portion of the mold for subjecting the mold to a fluid under pressure to remove the fusible pattern therefrom.

12. In a device for eliminating fusible patterns from molds, a base, means forming a seat against which one end of the mold may be seated, a guide formed in said base, a post slidable along said guide and toward and from said seat, gearing carried by said base for advancing said post toward and from said seat and means for directing a fluid under pressure to said seat.

13. In a device for eliminating fusible patterns from molds, a boiler, means for heating the water within said boiler, said boiler having a steam discharge outlet near the center thereof, a seat for a mold formed on said boiler and communicating with said discharge outlet and means for urging a mold against said seat.

14. In a device for eliminating fusible patterns from molds, a boiler, a heater disposed within said boiler, an outlet in the bottom of said boiler, a tube connected with said outlet and passing upwardly beyond said heater for conducting steam from said boiler through said outlet, a seat formed on the bottom of said boiler and communicating with said outlet and means for urging the mold against said seat.

15. In combination, a standard, a base for supporting said standard having a lateral extension on one side of said standard forming an abutment, a container for fluid under pressure superimposing the lateral extension of said base and carried by said standard and forming another abutment, means acting against a mold positioned between said container and base extension and against one of said abutments for urging said mold against the other of said abutments, means on the abutment engaging said mold for delivering a fluid under pressure thereto, said means being in communication with said container.

16. In combination, a base, a standard issuing upwardly from said base, a container for fluid under pressure superimposing said base and carried by said standard, means carried by said base and engaging a mold from beneath, means connected with said container and capping said mold on the opposite side thereof, said means being in communication with said container for delivering fluid under pressure from said container to said mold, one of said means being movable toward and from the other means to clamp said mold therebetween.

17. In a device for eliminating fusible patterns from molds formed with a flask open at opposite ends, a container for fluid under pressure, said container being formed with a dished bottom providing a seat against which one end of the flask may be seated, an outlet in said bottom for conducting the fluid under pressure in said container to the space between said bottom and mold, and means for engagement with the other end of the flask for holding said mold in contact with said seat.

In testimony whereof I have affixed my signature.

HARRY C. HAGMAN.